3,547,790
AROMATIC CONDENSATION PRODUCTS
Bobby F. Dannels and Alvin F. Shepard, Grand Island, N.Y., assignors to Hooker Chemical Corporation, Niagara Falls, N.Y., a corporation of New York
No Drawing. Division of application Ser. No. 327,125, Nov. 29, 1963, now Patent No. 3,386,899, dated June 4, 1968. Continuation of application Ser. No. 674,749, Oct. 12, 1967. This application Aug. 1, 1969, Ser. No. 849,260
The portion of the term of the patent subsequent to June 4, 1985, has been disclaimed
Int. Cl. B01k 1/00
U.S. Cl. 204—59   8 Claims

ABSTRACT OF THE DISCLOSURE

A process for producing aromatic condensation products comprises passing an electric current between a cathode and an anode in contact with liquid phase hydrogen fluoride, wherein the hydrogen fluoride is also in contact with an aromatic compound having a hydrogen atom substituted in at least one position of the aromatic ring. The process is capable of producing novel aromatic condensation products from benzene, alkyl-substituted benzenes, halogen-substituted benzenes, naphthalene, diphenyl, terphenyl, phenol, alkyl-substituted phenols and halogen-substituted phenols. The hydrogen fluoride can be substantially pure, or it can contain various additives, especially water, depending on the results desired in the process. The polymer products have excellent heat resistance and electrical insulation properties and can be coated on other types of polymers to modify the surface characteristics thereof. The polymers can be converted to sulfonated polymer products.

CROSS-REFERENCE TO PRIOR APPLICATIONS

This is a continuation of Ser. No. 674,749, filed Oct. 12, 1967, now abandoned, and a division of application Ser. No. 327,125, filed Nov. 29, 1963, now U.S. Pat. No. 3,386,899, granted June 4, 1968.

This invention relates to novel processes for the condensation and polymerization of aromatic compounds and to novel aromatic polymers produced by electrolytic methods. In other aspects, the invention relates to the application of electrolysis to two-phase liquid systems and to novel electrical conductors made from normally non-conducting substances.

Attempts have been made to form polymers of aromatic compounds such as benzene. It has often been the practice to resort to other more expensive starting materials than, for example, benzene. Thus, 1,3-cyclohexadiene has been used as a starting material. In addition to requiring the more expensive reactant, two reaction steps are required by such a method. There has been a need for a direct method for preparing aromatic polymers from the simplest, least expensive, commercially available compounds.

Accordingly, it is an object of this invention to provide new processes for the polymerization of aromatic compounds. It is another object of the invention to provide the art with new polymers from aromatic compounds. A further object of the invention is to provide an electrolytic process for the condensation of aromatic compounds. Also an object of the invention is the provision of a two-phase electrolytic system of normally non-conducing materials that is highly conductive at the interface. It is still another object of the invention to provide a method for making aromatic polymers in a form wherein they are electrically conductive. These and other objects of the invention will become more apparent upon further consideration of the following specification.

In accordance with one aspect of this invention, there is provided a process for producing aromatic condensation products which comprises passing an electric current between a cathode and anode in contact with liquid phase hydrogen fluoride, wherein the hydrogen fluoride is also in contact with an aromatic compound having a hydrogen atom in at least one position of the aromatic ring. Preferably two positions are hydrogen-substituted. Suitable aromatic compounds are benzene, alkyl-substituted benzenes, halogen-substituted benzenes, naphthalene, diphenyl, terphenyl, phenol, alkyl-substituted phenols, and halogen-substituted phenols, provided that at least one position of the aromatic ring is substituted with hydrogen. Suitable mono-nuclear reactants have the formula:

wherein X is selected from the group consisting of hydrogen and hydroxyl, and R is selected from the group consisting of hydrogen, fluorine, chlorine, bromine and lower alkyl, provided that at least one position and preferably at least two positions on the phenyl ring are substituted with hydrogen. The alkyl groups generally have 1 to 4 carbon atoms, e.g., methyl, ethyl, propyl, isopropyl, 1-butyl, 2-butyl and isobutyl. The halogen can be fluorine, chlorine, or bromine.

The aromatic compounds that can be used in the practice of this invention include benzene, toluene, ortho-, meta-, and para-xylene; 1,3,5-trimethylbenzene; 1,2,4,5-tetramethylbenzene; pentamethylbenzene; naphthalene; diphenyl; terphenyl; ethylbenzene; isopropyl benzene; sec-butyl benzene; and the phenols such as phenol itself, resorcinol, catechol, hydroquinone, phloroglucinol, methyl phenol, dimethylphenol, diethyl phenol, diisopropyl phenol and dibutyl phenol. Also useful are the halogenated derivatives of the foregoing compounds, such as mono-, di-, tri-, and pentachlorobenzene; mono-, di-, and trifluorobenzene; mono-, di-, and tribromobenzene; mono-, di-, and trichlorotoluene; mono-, di-, and trifluorotoluene; mono-, di-, and tribromotoluene; mono- and dichloroxylene; mono- and dibromo xylene; mono-, di-, and trichlorophenol; mono-, di-, and trifluorophenol; mono-, di-, and tribromophenol; mono- and di-chloromethyl phenol; mono- and difluoromethylphenol; mono- and dibromomethylphenol; fluorodimethylphenol; chlorodimethylphenol; and bromodimethylphenol. The various isomers of the foregoing compounds are useful.

The hydrogen fluoride can be substantially pure, or it can contain various additives depending on the results desired in the process. Additives that are soluble in hydrogen fluoride and which promote the formation of fluoride ions can be employed to modify the conductivity of the electrolytic system and further to modify the nature of the products of the process. Suitable additives are water, mineral acids and their salts, organic acids and their salts, alcohols and ethers; for example: sulfuric acid, nitric acid, sodium fluoride, potassium fluoride, potassium nitrate, potassium sulfate, silver nitrate, boron trifluoride, acetic acid, benzoic acid, potassium acetate, ethyl alcohol, ethyl ether and the like. Generally, the conductivity of the system is increased by increasing the quantity of such additives in the hydrogen fluoride. The water content can be varied from about 0 to about 40 parts by weight per 100 parts of hydrogen fluoride. The hydrogen fluoride can be substantially anhydrous (less than 0.1 part water per 100) or aqueous (at least 0.1 part water per 100). The preferred range for the aqueous system is 5 to 35 parts by weight water per 100 parts of hydrogen fluoride. The ratio of other additives can be from about 0 to about 30 parts by weight additive per 100 parts of hydrogen fluoride. The temperature of the cell liquor (aromatic compound and hydrogen fluoride) is generally from about 0 to about 20° C. The process is usually carried out in the liquid phase. However, products can be successfully formed at temperatures as low as −80° C., which is below the freezing point of many aromatic compounds. Likewise, higher temperatures than 20°, for example, up to 100° C. can be employed by operating the process under super atmospheric pressure so as to maintain the hydrogen-fluoride in the liquid phase.

A wide variety of electrodes can be employed in the process. Typical examples of suitable anodes and cathodes are metals such as the platinum group metals, particularly platinum itself, nickel, iron, cobalt, and molybdenum. Materials for use specifically at the cathode are graphite, silver and gold. The potential gradient between electrodes is generally from about 1 to 100 volts. When aqueous hydrogen fluoride is employed, potentials in the lower portion of the range are employed, e.g., less than 10 volts and preferably about 1 to 6 volts.

In practicing the invention, both the cathode and anode should be in contact with the hydrogen fluoride phase. The cathode and anode can be totally immersed in the hydrogen fluoride phase, or can merely touch the interface between phases, or can pass through the interface. When aqueous hydrogen fluoride is employed, the anode should also be in contact with the aromatic compound phase. The anode can pass through the interface between the aromatic compound and hydrogen fluoride, or can merely be in contact with (touch) the interface. It has been found that the two-phase electrolytic system of the invention exhibits excellent electrical conductivity when the foregoing positioning is effected. This conductivity was demonstrated in an electrolytic system comprising 65 parts by weight of benzene in one phase, and 230 parts hydrogen fluoride and 50 parts of water in the second liquid phase. The hydrogen fluoride was the heavier phase. Platinum electrodes (3.7 cm. x 5 cm. x 1 mm.) were vertically disposed in the electrolytic cell with their flat surfaces parallel and 8 cm. apart. The electrodes were located at various positions in the electrolytic cell and a potential of three volts was applied between the electrodes in each case. The resulting current flow between electrodes was measured and is set forth in Table I for each position of the electrodes. For the positions denoted "through interface" in the table, approximately half of the electrode area was in each of the liquid phases:

TABLE I

| Location of | | Current, |
|---|---|---|
| Anode | Cathode | Ampheres |
| Benzene phase | Benzene phase | 0.0 |
| HF phase | do | 0.0 |
| Benzene phase | HF phase | 0.0 |
| Do | Through interface | 0.0 |
| Through interface | Benzene phase | 0.0 |
| HF phase | HF phase | 0.1 |
| Do | Through interface | 0.1 |
| Through interface | do | 1.9 |
| Do | Just touching interface | 1.0 |
| Do | HF phase | 2.0 |
| Just touching interface | Through interface | 1.9 |

No similar conductivity phenomena were found with two-phase mixtures of benzene with other acids, e.g., hydrogen cyanide, phosphoric acid, or sulfuric acid.

The process of the invention results in the production of various useful aromatic condensation products. Chief of these are polymeric products that are characterized by their excellent heat resistance and electrical insulation properties. Dimer products can also be produced in accordance with the invention.

Further information on the process of this invention and the aromatic condensation products produced thereby is provided in the following examples which are presented for purposes of illustration, but with no intention of limiting the invention. Unless specified otherwise, all parts are by weight and temperatures are in degrees centigrade.

Example 1

A closed polyethylene cell was provided with a gas inlet tube, a gas outlet tube connected to a reflux condenser, and two square sheet nickel electrodes, measuring 3.5 x 3.5 x 1/32 inches, and connected by copper wires to positive and negative poles of a source of direct current. The electrodes were positioned 2.25 inches apart, with their 3.5 x 3.5 inch faces disposed vertically and parallel. Prior to use, the electrodes were polished until bright and heated to a dull red in a gas burner flame. The cell was also provided with a magnetically driven Teflon-coated agitator and was cooled to about 10 degrees centigrade by external cooling means.

To the cell were added 245 grams anhydrous hydrogen fluoride, 30 grams of 52% aqueous hydrogen fluoride and 25 grams of benzene. The hydrogen fluoride phase contained 5.5 parts of water per hundred parts hydrogen fluoride and was the heavier phase. The anode and cathode were positioned to be in contact with both the hydrocarbon phase and the hydrogen fluoride phase. A potential of 1.5 volts was applied between the electrodes. A current of 0.1 ampere flowed. After four hours, 0.34 gram of black polymer which was quite tough and flexible was recovered from the anode. The polymer was washed with water until free of acid and dried to constant weight in vacuum. Analysis indicated that polymer had an empirical formula of $C_6H_{3.6}F_{0.1}O_{0.1}$.

Example 2

The procedure of Example 1 was repeated except that a potential of 4.5 volts was applied between the electrodes. The average current flow during the four hour reaction time was about 5 amperes. There was recovered from the anode 9.0 grams of polymer, most of which had formed at the interface between the benzene and hydrogen fluoride phases. Analysis of the polymer product indicated an empirical formula of $C_6H_{3.3}F_{0.5}O_{0.3}$.

Example 3

Into the cell described in Example 1, there were introduced 47.5 grams of benzene, 173 grams of anhydrous hydrogen fluoride and 90 grams of 52% aqueous hydrogen fluoride. The water content of the hydrogen fluoride phase was 19.7 parts of water per hundred parts of hydrogen fluoride. A potential of 3.0 volts was applied between the electrodes for a period of four hours during which time the current averaged about 2 amperes. 5.8 grams of infusible and insoluble polymer, which had formed principally at the liquid-liquid interface, were recovered. Analysis of the polymer showed it to have an empirical formula of $C_6H_{3.3}F_{0.4}O_{0.3}$.

Example 4

The procedure described in Example 3 was repeated, except that the cell liquor comprised 25 grams of benzene, 131 grams of anhydrous hydrogen fluoride, and 151 grams of 52% aqueous hydrogen fluoride to provide a water content in the hydrogen fluoride phase of 34.6 parts water per hundred parts of hydrogen fluoride. A potential of 1.5 volts was applied between the electrodes and the current averaged about 0.1 ampere during the four hour reaction period. At the end of this time, 0.2 gram of black polymer was recovered from the anode. Analysis showed the polymer to have an empirical formula of $C_6H_{3.9}F_{0.7}O_{0.5}$.

Example 5

The procedure of Example 4 was repeated except that a potential of 4.5 volts was applied between the electrodes and the current averaged about 1 ampere during the four hour reaction time. The amount of black polymer formed at the anode mainly at the liquid-liquid interface was 1.4 grams. Analysis of the polymer indicated it to have an empirical formula of $C_6H_{3.4}F_{1.0}O_{0.4}$.

The polymer produced in Example 3 was compacted into test specimens at 200 degrees centigrade and 2800 kilograms per square centimeter. The specimens were subjected to successively higher temperatures for extended periods of time in both air and nitrogen environments. The loss in weight of each specimen for each high temperature exposure was determined. The electrical resistance of each specimen at the end of the high temperature test period was also determined. These results together with the conditions of the tests are presented in the following table.

TABLE II

| Specimen | Environment | Time, hours | Temp., °F. | Total wt. loss, percent | Final electrical resistance, ohms |
|---|---|---|---|---|---|
| A | Air | 22 / 1 24 / 1 24 | 374 / 563 / 608 | 0.9 / 4.7 / 9.8 | $1 \times 10^{13}$. |
| B | Air | 24 / 1 24 / 1 22 | 460 / 600 / 600 | 0.6 / 30 / 35 | $1 \times 10^{11}$. |
| C | Nitrogen | 24 / 1 16 / 1 6 | 608 / 806 / 1,004 | 2.3 / 3.9 / 7.0 | $2 \times 10^{9}$. |
| D | Nitrogen | 24 | 1,000 | 10.5 | $4 \times 10^{8}$. |
| E | Nitrogen | 24 | 1,200 | 14.2 | 80; HF given off. |

[1] Additional.

Example 6

In the cell described in Example 1, the nickel electrodes were replaced by two rectangular platinum electrodes measuring 3 x 2 inches. Into the cell was charged 50 grams of benzene, 70 grams of potassium fluoride and 216 grams of anhydrous hydrogen fluoride. A potential of three volts was applied between the electrodes, and the resulting current was one ampere. After a reaction of 3.5 hours, 2.8 grams of black polymer, which had formed principally at the liquid-liquid interface, were recovered from the anode.

Example 7

Into the cell of Example 6, which had been fitted with platinum electrodes, there were introduced 228 grams of anhydrous hydrogen fluoride, and 50 grams of benzene at approximately 10 degrees centigrade. This mixture was saturated with boron trifluoride. A potential of 3 volts was applied between the electrodes and the current averaged about 0.4 ampere during the six hour reaction time. 2.6 grams of a soft spongy polymer formed. Analysis showed that the empirical formula of the polymer was $C_6H_{3.5}F_{0.06}$.

Example 8

A polymer was prepared using the procedure of Example 3 except that an iron anode was substituted for the nickel anode. 4.1 grams of polymer were recovered, washed free of acid and dried in vacuum. The arc resistance of the polymer was determined by ASTM test D-495 and was found to be 120–130 seconds.

Example 9

Into the cell described in Example 1 were charged 171 grams of anhydrous hydrogen fluoride, 91 grams of 52% aqueous hydrogen fluoride and 48 grams of benzene. The cell liquor was thoroughly agitated. Agitation was halted and a potential of three volts was applied between the electrodes. The resulting current was 2.8 amperes. After a four hour reaction time, there were recovered from the anode 8.7 grams of black polymer. The product was washed with water until free of acid and was dried to constant weight in vacuum. Analysis of the product indicated an empirical formula of $C_6H_{3.2}F_{0.38}O_{0.28}$.

Example 10

The procedure of Example 9 was repeated with the cell fitted with 3 x 4 inch platinum electrodes. The cell was charged with 179 grams of anhydrous hydrogen fluoride, 90.5 grams of 52% aqueous hydrogen fluoride and 47 grams of benzene. A potential of three volts was applied between the electrodes, and the resulting current was 1.5–1.8 amperes. After a reaction time of four hours, it was found that 5.5 grams of polymer similar to that made in Example 3 had been produced.

Example 11

To the cell used in Example 10 and equipped with platinum electrodes, there were charged 221 grams of anhydrous hydrogen fluoride, 4 grams of 52% aqueous hydrogen fluoride and 50 grams of benzene. Boron trifluoride was then bubbled through the liquids until the gain in weight was 17.7 grams. A potential of three volts was applied between the electrodes, and the resulting current averaged 0.5 ampere. About 2 grams of dark brown polymer was recovered from the anode and were washed and dried. Analysis of the polymer product indicated an empirical formula of $C_6H_{3.74}F_{0.05}O_{0.06}$.

Example 12

Into the cell used in Example 10, there were charged 163.3 grams of anhydrous hydrogen fluoride and 50 grams of benzene. A potential of 15 volts was applied between the electrodes. The initial current flow was 0.1 ampere. During the 5.5 hours reaction time, the current slowly increased to 0.55 ampere. A small amount of black polymer was recovered from the anode. Evaporation of the cell liquor gave 2.0 grams of light gray fusible polymer.

A quantity of light gray fusible polymer produced in accordance with the method described in the foregoing paragraph was placed in a small side arm flask under a vacuum of 0.25 mm. mercury and was heated with a gas flame. Approximately one-half of the solid polymer sublimed as a white solid. The residual polymer was black but still fusible. The sublimed polymer was extracted with hot acetone, and approximately one-half of this material was found to be soluble in acetone. The infrered spectrum of the three fractions showed them to have the polyphenyl structure. Chemical analysis and X-ray analysis of the fractions gave the results shown in the following table:

EMPIRICAL FORM

| Sublimed fraction soluble in acetone | Sublimed fraction insoluble in acetone | Residual polymer | p-Terphenyl | Polymer of Example 3 |
|---|---|---|---|---|
| $C_6H_{4.15}F_{0.04}$ | $C_6H_{4.15}F_{0.03}$ | $C_6H_{4.11}F_{0.04}$ | $C_6H_{4.67}$ | $C_6H_{3.3}F_{0.4}O_{0.3}$ |

X-ray diffraction pattern.—D-spacings in angstroms; peaks in order of decreasing intensity

|  |  |  | 12.6 |  |
|---|---|---|---|---|
|  |  |  | 6.6 |  |
|  | 4.47 | 4.48 | 4.6 | 4.4 |
| 4.17 |  |  |  |  |
| 3.86 | 3.77 | 3.86 | 3.78 |  |
| 3.23 | 3.12 | 3.18 | 3.13 |  |

The fraction that was insoluble in acetone and the residual polymer fraction can be characterized as p-polyphenyls. The soluble fraction had a softening point of about 250 degrees centigrade, the insoluble fraction softened in the range of 300 to 350 degrees centigrade, while the residual fraction softened above 350 degrees centigrade.

Example 13

Using the same procedure as that employed in Example 12, a mixture of hydrogen fluoride and benzene was electrolyzed with 50 volts applied between the electrodes. The current slowly increased from 0.12 to 0.46 ampere over a 4.5 hour period. There was a small amount of black polymer recovered from the anode. Upon evaporation of the cell liquor, a quantity of white-gray fusible polymer was recovered. Analysis of the benzene phase indicated the absence of any fluorobenzenes.

Example 14

Into the cell described in Example 6, there were introduced 252 grams of anhydrous hydrogen fluoride and 50 grams of mesitylene. A potential of 3 to 4 volts was applied between the electrodes and the resulting current was 0.2 ampere. After a reaction time of 1.5 hours, 1.1 grams of dark brown polymer was recovered from the anode. This polymer was insoluble in acetone.

Example 15

To the cell of Example 1, there were added 173 grams of anhydrous hydrogen fluoride, 90 grams of 52% aqueous hydrogen fluoride and 25 grams of toluene. A potential of 5 volts was applied between the electrodes. A current of 0.15 to 0.2 ampere flowed. After four hours, 0.5 gram of black powdery solid was recovered from the anode.

Example 16

In the cell of Example 6, there were placed 172 grams of anhydrous hydrogen fluoride, 90 grams of 52% aqueous hydrogen fluoride, and 48 grams of phenol. Three volts were applied across the electrodes. The resulting current was 3.0 amperes. After 4 hours, 0.5 gram of brown polymer was obtained from the anode. This was insoluble in acetone, 10% NaOH and alcoholic KOH. An additional 1.5 grams of polymer were obtained from the cell residue.

Example 17

Using the same procedure as that employed in Example 16, parachlorophenol is used as the aromatic reactant to produce a polymeric condensation product.

Example 18

Into a plastic cell fitted with platinum electrodes, there were placed 17 grams of anhydrous hydrogen fluoride, 4 grams of 52% aqueous hydrogen fluoride and 5 grams of monofluorobenzene. A potential of 3 to 4 volts was applied between the electrodes. The current was 0.1 to 0.02 ampere. After 6 hours, there was recovered from the anode 0.15 gram of brown fusible resin, having an empirical formula of $C_6H_{2.26}F_{1.16}O_{0.23}$.

Example 19 p-Difluorobenzene was electrolyzed in the same manner as the fluoro-benzene of Example 18. The product was a white resin and weighed 0.2 gram. Analysis showed it to have an empirical formula of $C_6H_{2.57}F_{2.18}O_{0.21}$.

Example 20

Into the cell of Example 6 there was placed 170 grams of anhydrous hydrogen fluoride, 40 grams of 52% aqueous hydrogen fluoride and 50 grams of bromobenzene. Three volts were applied between the electrodes. The resulting current varied between 0.29–0.14 volt. After 4 hours there was found deposited under the anode, mainly at the liquor-liquid interface 0.75 gram of black fusible polymer.

Example 21

Into a small polyethylene cell fitted with platinum electrodes there were placed 110 grams of anhydrous hydrogen fluoride and 17 grams of o-terphenyl. A potential of 15 volts was applied between the electrodes. The current was 0.1–0.5 ampere. After seven hours the cell was opened and the hydrogen fluoride distilled off. The residue was thoroughly washed with benzene. The black insoluble high melting condensation product weighed 3.7 grams.

The polymers produced in accordance with this invention result from the condensation of the aromatic nuclei of the starting reactants, which is accompanied by the evolution of hydrogen at the cathode. The benzene condensation polymers characteristically contain from about 3 to 4.5 atoms of hydrogen, more usually from 3.2 to 4.2 atoms, and from about 0.02 to 1.2 atoms of fluorine, usually from 0.03 to 1 atom, for each six carbon atoms. The polymers produced in aqueous hydrogen fluoride also contain about 0.01 to 1.0 atom of oxygen, usually 0.05 to 0.5 atom per six carbon atoms, are amorphous in nature and brown to black in color. The polymers produced with anhydrous hydrogen fluoride are partially soluble in acetone, crystalline in nature, contain the polyphenyl structure, and are white to gray in color.

Polymers produced from monofluorobenzene characteristically contain 2.2 to 3.0 atoms of hydrogen, and 1 to 1.5 atoms of fluorine for each six carbon atoms. The polymers produced in aqueous hydrogen fluoride also contain 0.01 to 0.5 atom of oxygen per six carbon atoms.

Polymers produced from difluorobenzene generally contain 2 to 2.75 atoms of hydrogen, and 2 to 2.5 atoms of fluorine for each six carbon atoms. The polymers produced in aqueous hydrogen fluoride have 0.01 to 0.5 atom of oxygen per six carbon atoms.

Phenol-based polymers contain a greater amount of oxygen, 1 to 1.5 atoms, together with 3.5 to 4.5 atoms of hydrogen and 0.02 to 0.5 atom of fluorine for each six carbon atoms.

The polymer deposit as formed in the cell is apparently swollen with cell liquor and, in this condition, it possesses the property, uncommon among non-metals, of conducting electricity by what appears to be a non-ionic process. The non-ionic nature of the conductance through the deposit is evident from the fact that the polymer layer may grow outward horizontally several inches from the anode with little increase in thickness or evolution of gases at the metal anode. As further evidence of non-ionic conductivity, the anode and adhering polymer deposit may be relocated in the cell in such a way that the metal anode is situated entirely in the benzene phase and the polymer deposit extends through the $C_6H_6$—HF interface. With this arrangement, good conductivity is obtained and, on electrolysis, a new polymer deposit forms on the side of the original deposit and grows horizontally along the $C_6H_6$—HF interface. Essentially, no growth occurs at the former growing edge of the original polymer deposit which is in the hydrogen fluoride phase.

The polymer deposit also exhibits directional variation of conductivity, as shown by the following simple illustration. A polymer deposit is built up on a platinum anode, is then removed from the cell and its conductivity is measured by touching a resistance meter probe to it. The conductivity decreases greatly when the polarity of the probe is reversed, and returns to its original value when the original polarity is restored. These conductivity phenomena are useful in electronic devices.

The new polymers produced in accordance with this invention combine excellent heat resistance with electrical insulation properties and can be used in insulating compositions and devices intended for use at high temperatures. Plating of the aromatic polymer on other plastics is also accomplished by modifications of the method of obtaining a conductive interface. In this modification, a solution of aromatic compound in hydrogen fluoride is brought into contact with a portion of a suitable plastic, for example, a polyethylene surface wetted with hydrogen fluoride, making connection between an anode and cathode. Then, when a moderate voltage is applied to the electrodes, current flows and the polymer is deposited on the surface of the plastic conductor in the form of a thin and strongly adherent layer adjacent to the anode. This type of plating can be applied to polyolefins other than polyethylene, such as ethylene copolymers, polypropylene and poly(tetrafluoroethylene).

Following is an example of the use of the polymer of the invention to coat other polymers.

Example 22

In the cell employed in Example 1, a strip of polyethylene was attached between the electrodes in a position to be in the hydrogen fluoride phase. Then, 245 grams anhydrous hydrogen fluoride, 30 grams of 52% aqueous hydrogen fluoride and 25 grams of benzene were introduced to the cell. A potential of 3.0 volts was applied between the electrodes for a period of four hours. At the end of this period, the polyethylene was coated with a strongly adherent film of benzene polymer.

Following the same procedure, a strip of poly(tetrafluoroethylene) was also coated with a strongly, adherent film of benzene polymer.

The process of this invention can also be employed to plate aromatic polymer onto metals, by using as the anode, the metal which it is desired to plate as shown in the following example.

Example 23

A small polyethyelne cell was fitted with a rectangular sheet iron anode and a platinum cathode. The cell was charged with 313 grams of anhydrous hydrogen fluoride and two grams of benzene. Four volts were applied between the electrodes. The current was 0.03 to 0.10 ampere. After 1.5 hours, the anode was removed. It was uniformly coated with a film of polymer. This coating did not blister when placed in a gas flame.

Any metal that is suitable for use as the anode in this process can be plated in this manner.

The polymers of this invention are convertible to sulfonated products as shown in the following example.

Example 24

The aromatic polymer as produced in Example 3 was heated with 100 grams of 20% oleum for 16 hours at 140 degrees, and thereafter for four hours at 170 to 180 degrees centigrade. The sulfonated product was recovered by filtering off the solid product of the reaction, washing thoroughly with water and drying at 100 degrees centigrade under vacuum. The dried product analyzed 14.5 weight percent sulfur. The product was hygroscopic but did not dissolve in water.

The process of the invention can be employed to produce condensation products that are not high polymers as shown in the following examples.

Example 25

Into the cell of Example 6, there were placed 155 grams of anhydrous hydrogen fluoride and 50 grams of monochlorobenzene. Twenty volts were applied between the electrodes. The resulting current was 0.07 ampere. After 6 hours, the cell was disassembled and the HF and chlorobenzene were boiled off. The residue weighed 0.23 gram. From this, there was sublimed off a colorless crystalline solid having the melting point (145 to 147 degrees) of p,p'-dichlorodiphenyl.

Example 26

Into the cell of Example 6, there were placed 219 grams of anhydrous hydrogen fluoride and 50 grams of phenol. Fifteen volts were applied between the electrodes, the current was 0.6 to 0.7 ampere. After 4.75 hours, the cell was disconnected. The hydrogen fluoride was evaporated and the residue was dissolved in hot water. Approximately, 3.7 grams of product was insoluble in water. This insoluble material was divided into two fractions by distillation. The portion not volatile below 250 degrees centigrade/0.25 mm. was a black resin. The volatile portion solidified and after recrystallization from ethanol the solid was found to have the infrared spectrum of p,p'-biphenol. The solid melted at 272 to 275 degrees and did not depress the melting point of authentic p,p'-biphenol.

Example 27

Anhydrous hydrogen fluoride (172 grams) 52% aqueous hydrogen fluoride (90 grams) and 2,6-dimethyl phenol (47.5 grams) were placed in the cell of Example 6. The current was 0.8 to 1.4 amperes with 3 volts applied between the electrodes. After 4 hours, 1.1 grams of dark brown fusible resin was recovered from the anode. From the residue remaining in the cell after evaporation of the HF, there was recovered a viscous resinous material and a colorless crystalline material, corresponding in its melting point (224–224.5 degrees) and its hydroxyl content, with 3,5,3',5' - tetramethyl - 4,4'-dihydroxydiphenyl. Beilstein, vol. VI, p. 1015, gives 220 to 221 degrees for the melting point of this compound.

Example 28

Into the cell of Example 1, there were introduced 172 grams of anhydrous hydrogen fluoride, 90 grams of 52% aqueous hydrogen fluoride and 48 grams of naphthalene. A potential of 5.5 volts was applied between the electrodes. A current of 0.8 to 0.3 ampere flowed. After two hours, the anode was removed. There was deposited upon it a very viscous condensation product that was soluble in acetone.

Example 29

Into the cell of Example 6, there were introduced 180 grams of anhydrous hydrogen fluoride, 90 grams of 52% aqueous hydrogen fluoride and 48 grams of diphenyl. A potential of 4.5 volts was applied between the platinum electrodes. The current was 1.7 to 2.1 amperes. The anode was removed after four hours. There was found deposited upon it a very viscous condensation product that was soluble in acetone.

While the invention has been described with reference to certain specific embodiments, it will be recognized by those skilled in the art that many variations are possible without departing from the spirit and scope of the invention.

We claim:

1. An aromatic polymer produced by passing an electric current between a cathode and an anode in contact with liquid phase hydrogen fluoride, said hydrogen fluoride being in contact with an aromatic compound having a hydrogen atom in at least one position of the aromatic ring and selected from the group consisting of benzene, alkyl-substituted benzenes, halogen-substituted benzenes, naphthalene, diphenyl, terphenyl, phenol and halogen-substituted phenols.

2. An infusible aromatic polymer having 3 to 4.5 hydrogen atoms, 0.02 to 1.2 fluorine atoms and 0 to 1 oxygen atom for each six carbon atoms and produced in accordance with claim 1 wherein the aromatic compound is benzene and the hydrogen fluoride contains 5 to 35 parts by weight of water per 100 parts of hydrogen fluoride.

3. A fusible, crystalline aromatic polymer having 3 to 4.5 hydrogen atoms, and 0.02 to 1.2 fluorine atoms for each six carbon atoms, and having a polyphenyl structure and produced in accordance with claim 1 wherein the aromatic compound is benzene and the hydrogen fluoride contains less than 0.1 part by weight of water per 100 parts of hydrogen fluoride.

4. An aromatic polymer having 3.5 to 4.5 hydrogen atoms, 0.02 to 0.5 fluorine atom and 1 to 1.5 oxygen atoms for each six carbon atoms and produced in accordance with claim 1 wherein the aromatic compound is phenol and the hydrogen fluoride contains 5 to 35 parts by weight of water per 100 parts of hydrogen fluoride.

5. A fusible aromatic polymer having 2.2 to 3 hydrogen atoms, 1 to 1.5 fluorine atoms and 0.01 to 0.5 oxygen atom for each six carbon atoms and produced in accordance with claim 1 wherein the aromatic compound is monofluorobenzene and the hydrogen fluoride contains 5 to 35 parts by weight of water per 100 parts of hydrogen fluoride.

6. A fusible aromatic polymer having 2 to 2.75 hydrogen atoms, 2 to 2.5 fluorine atoms and 0.01 to 0.5 oxygen atom for each six carbon atoms and produced in accordance with claim 1 wherein the aromatic compound is p-difluorobenzene and the hydrogen fluoride contains 5 to 35 parts by weight of water per 100 parts of hydrogen fluoride.

7. An article comprising a solid polyolefin and as an adherent solid coating therefor the aromatic polymer of claim 2.

8. An article comprising a metal selected from the group consisting of platinum, nickel, iron, cobalt and molybdenum, and as an adherent solid coating therefor the aromatic polymer of claim 2.

References Cited

UNITED STATES PATENTS 3,386,899   6/1968   Shepard et al. _____ 260—2

OTHER REFERENCES

Handbook of Chemistry and Physics, 39th Ed. (1957–1958), Chemical Rubber Publ. Co., Cleveland, Ohio, pp. 812–815.

SAMUEL H. BLECH, Primary Examiner

U.S. Cl. X.R.

117—93, 132, 138.8, 161; 204—20, 22, 23, 27, 72; 252—500; 260—2, 47, 79.2, 620, 649